(12) United States Patent
Xu et al.

(10) Patent No.: US 10,777,161 B2
(45) Date of Patent: Sep. 15, 2020

(54) ARRAY SUBSTRATE, LIQUID CRYSTAL DISPLAY PANEL AND DISPLAY DEVICE

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Zhuo Xu, Beijing (CN); Yajie Bai, Beijing (CN); Xiaoyuan Wang, Beijing (CN); Rui Wang, Beijing (CN); Jaikwang Kim, Beijing (CN); Fei Shang, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 242 days.

(21) Appl. No.: 15/747,672

(22) PCT Filed: Jun. 30, 2017

(86) PCT No.: PCT/CN2017/091040
§ 371 (c)(1),
(2) Date: Jan. 25, 2018

(87) PCT Pub. No.: WO2018/082326
PCT Pub. Date: May 11, 2018

(65) Prior Publication Data
US 2020/0082779 A1   Mar. 12, 2020

(30) Foreign Application Priority Data
Nov. 1, 2016  (CN) .......................... 2016 1 0935519

(51) Int. Cl.
*G09G 3/36*  (2006.01)

(52) U.S. Cl.
CPC ......... *G09G 3/3688* (2013.01); *G09G 3/3614* (2013.01); *G09G 2330/021* (2013.01)

(58) Field of Classification Search
CPC ............... G09G 3/3688; G09G 3/3614; G09G 2330/021
See application file for complete search history.

(56) References Cited

U.S. PATENT DOCUMENTS

2002/0118154 A1   8/2002   Kim
2004/0263466 A1   12/2004  Song et al.
(Continued)

FOREIGN PATENT DOCUMENTS

CN   1372241 A       10/2002
CN   101325048 A    12/2008
(Continued)

OTHER PUBLICATIONS

Search Report and Written Opinion for International Application No. PCT/CN2017/091040 dated Sep. 9, 2017.
(Continued)

*Primary Examiner* — Mark W Regn
(74) *Attorney, Agent, or Firm* — Calfee, Halter & Griswold LLP (57) ABSTRACT

An array substrate is disclosed. The array substrate has a display area and a non-display area in the periphery of the display area, and includes a plurality of gate lines to which gate pulse signals are provided; a plurality of data lines to which data signals are provided, wherein signals on adjacent ones of the plurality of data lines have opposite polarities; a charge sharing device includes a first thin film transistor in the non-display area, a first terminal of the first thin film transistor being connected to one of two adjacent data lines among the plurality of data lines, a second terminal thereof being connected the other of the two adjacent data lines, and (Continued)

a gate thereof being configured to be provided with a first control signal in a blank time period between adjacent data frames so as to turn on the first thin film transistor.

20 Claims, 5 Drawing Sheets

(56) References Cited

U.S. PATENT DOCUMENTS

| | | | |
|---|---|---|---|
| 2007/0001992 A1* | 1/2007 | Kim | ............... G09G 3/3648 345/100 |
| 2007/0296661 A1 | 12/2007 | Ishiguchi | |
| 2009/0225066 A1 | 9/2009 | Sawahata | |
| 2010/0033419 A1 | 2/2010 | Lin | |
| 2014/0160382 A1 | 6/2014 | Shang et al. | |
| 2015/0015471 A1 | 1/2015 | Zhu | |
| 2015/0287374 A1 | 10/2015 | Chen et al. | |

FOREIGN PATENT DOCUMENTS

| | | |
|---|---|---|
| CN | 102998830 A | 3/2013 |
| CN | 103345094 A | 10/2013 |
| CN | 103985347 A | 8/2014 |
| CN | 105652489 A | 6/2016 |

OTHER PUBLICATIONS

Partial Supplementary European search report for European Patent Application No. 17829905.3 dated Mar. 9, 2020.

\* cited by examiner

ARRAY SUBSTRATE, LIQUID CRYSTAL DISPLAY PANEL AND DISPLAY DEVICE

RELATED APPLICATION

The present application is the U.S. national phase entry of PCT/CN2017/091040, with an international filing date of Jun. 30, 2017, which claims the benefit of Chinese Patent Application No. 201610935519.8 filed on Nov. 1, 2016, the entire disclosures of which are incorporated herein by reference.

TECHNICAL FIELD

The present disclosure relates to the technical field of liquid crystal display, in particular to an array substrate, a liquid crystal display panel and a display device.

BACKGROUND

In a liquid crystal display panel, in order to avoid deterioration of the quality of liquid crystal molecules and bad display caused by a long time fixed voltage, signals provided to data lines in the display panel must undergo a polarity reversal. The polarity reversal drive of the panel usually includes point reversal, row reversal, column reversal, etc., wherein the column reversal has the smallest power consumption, so it is widely applied to panels of low logic power consumption.

During column reversal, signals on adjacent data lines have opposite polarities, so charge consumption for performing polarity reversal of the signals on the data lines can be reduced by means of charge sharing between adjacent data lines, thereby reducing power consumption. However, a charge sharing device generally has complex circuits, and key elements must be integrated on the IC, so the cost and volume of the IC are greatly increased.

SUMMARY

Therefore, it is desirable to provide an apparatus that can help to solve some or all of the above-mentioned problems.

According to a first aspect of the present disclosure, an array substrate is provided, which has a display area and a non-display area in the periphery of the display area, and comprises: a plurality of gate lines to which gate pulse signals are provided; a plurality of data lines to which data signals are provided, wherein signals on adjacent ones of said plurality of data lines have opposite polarities; a charge sharing device comprising a first thin film transistor in the non-display area, a first terminal of said first thin film transistor being connected to one of two adjacent data lines among said plurality of data lines, a second terminal thereof being connected the other of the two adjacent data lines, and a gate thereof being configured to be provided with a first control signal in a blank time period between adjacent data frames so as to turn on said first thin film transistor.

In certain exemplary embodiments, said first control signal comprises a frame turn-on signal or a turn-on signal for a gate driver.

In certain exemplary embodiments, said plurality of gate lines further includes a first dummy gate line in the non-display area, and wherein the gate of the first thin film transistor is connected to said first dummy gate line, and the first control signal is a gate pulse signal on said first dummy gate line.

In certain exemplary embodiments, said first dummy gate line is at a side of said plurality of data lines close to a source driver for providing data signals to said plurality of data lines.

In certain exemplary embodiments, said charge sharing circuit further includes a second thin film transistor in the non-display area, a first terminal of said second thin film transistor being connected to one of the two adjacent data lines, a second terminal thereof being connected the other of the two adjacent data lines, and a gate thereof being configured to be provided with a second control signal in a blank time period between adjacent data frames so as to turn on said second thin film transistor.

In certain exemplary embodiments, said second control signal comprises a frame turn-on signal or a turn-on signal for the gate driver.

In certain exemplary embodiments, said plurality of gate lines further includes a second dummy gate line in the non-display area, and wherein the gate of the second thin film transistor is connected to said second dummy gate line, and the second control signal is a gate pulse signal on said second dummy gate line.

In certain exemplary embodiments, said second dummy gate line is at a side of said plurality of data lines far away from the source driver for providing data signals to said plurality of data lines.

In certain exemplary embodiments, under the condition that the scanning direction for the gate lines is from the side of said plurality of data lines close to the source driver to the side far away from the source driver, said first dummy gate line is provided with a gate pulse signal prior to other gate lines.

In certain exemplary embodiments, under the condition that the scanning direction for the gate lines is from the side of said plurality of data lines far away from the source driver to the side close to the source driver, said second dummy gate line is provided with a gate pulse signal prior to other gate lines.

In certain exemplary embodiments, the first terminal and the second terminal of the first thin film transistor may adopt a U-shape structure and may be intersected with each other.

In certain exemplary embodiments, under the condition that there is a stage formed by the thin film transistor between any two adjacent data lines among said plurality of data lines, the first terminal of the first thin film transistor is connected to a second terminal of an adjacent previous stage thin film transistor, and the second terminal of the first thin film transistor is connected to a first terminal of an adjacent next stage thin film transistor.

In certain exemplary embodiments, the first thin film transistor can be located between a fan-shaped wiring area and the source driver.

In certain exemplary embodiments, the first thin film transistor can be located between the fan-shaped wiring area and the display area.

The array substrate provided in the present disclosure can realize optimal charge sharing effect without increasing the circuit design cost, thereby achieving the effect of saving power consumption.

According to a second aspect of the present disclosure, a liquid crystal display panel is provided, which comprises any of the above-mentioned charge sharing device.

According to a third aspect of the present disclosure, a display device is provided, which comprises the above-mentioned liquid crystal display panel.

These and other advantages of the present disclosure will become clearer from the embodiments described below, and will be depicted with reference to the embodiments described below.

BRIEF DESCRIPTION OF THE DRAWINGS

The present disclosure will now be described in further detail with reference to the drawings. The same or similar reference numerals indicate the same or similar elements throughout the drawings. In the drawings.

DETAILED DESCRIPTION

Specific details are provided in the text below for facilitating a full understanding and for enabling the various embodiments of the present disclosure. Those skilled in the art shall understand that the technical solutions of the present disclosure can be implemented in a case where many of said details are missing. In some circumstances, well known structures and functions are not shown or described in detail in order not to unnecessarily blur the descriptions of the embodiments of the present disclosure. It is anticipated that terms used in this disclosure should be understood in the broadest reasonable way, even if they are used in conjunction with detailed descriptions of specific embodiments of the present disclosure.

Figure 1A:
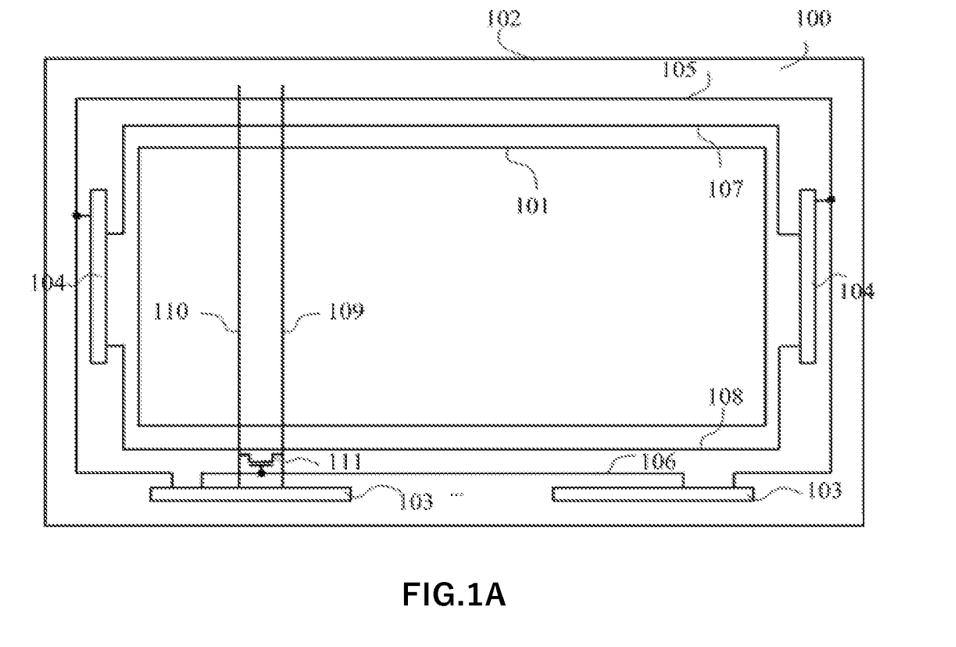
FIG. 1A shows an array substrate according to a first embodiment of the present disclosure.

FIG. 1A shows an array substrate 100 according to a first embodiment of the present disclosure. As shown in FIG. 1A, said array substrate 100 has a display area bounded by a display area outer frame 101 and a non-display area that is in the periphery of the display area and is bounded by an array substrate outer frame 102. Said array substrate further comprises a plurality of gate lines to which gate pulse signals are provided and a plurality of data lines to which data signals are provided, wherein signals on adjacent data lines among said plurality of data lines have opposite polarities. Said plurality of data lines and said plurality of gate lines are intersected with each other. For the sake of simplicity and clarity, FIG. 1A only shows two gate lines 107 and 108 and two adjacent data lines 109 and 110. It should be understood that although FIG. 1 only shows two gate lines in the non-display area, there are still several gate lines (not shown) that cross the display area and intersect with said plurality of data lines. Said gate pulse signals are provided by a gate driver 104, and said data signals are provided by a source driver 103. The array substrate further comprises a charge sharing device, which comprises a first thin film transistor 111 outside of the display area of the array substrate. A first terminal of the first thin film transistor 111 can be connected to a data line 109, a second terminal thereof can be connected to a data line 110, and a gate thereof is provided with a first control signal. Said first control signal is provided in a blank time period between adjacent data frames so as to turn on said first thin film transistor. After turning on said first thin film transistor, charges are shared between adjacent data lines 109 and 110.

As shown in FIG. 1A, a gate of the first thin film transistor 111 can be connected to a STV signal line 106, and the STV signal line 106 is connected to the source driver 103. In this embodiment, said source driver 103 is outside of the display area and provides a frame turn-on signal to the gate of the first thin film transistor 111 through the STV signal line 106. The frame turn-on signal is in the blank time period between adjacent data frames. Thus, by providing the frame turn-on signal to the gate of the first thin film transistor 111, the first thin film transistor can be turned on in the blank time period between adjacent data frames.

In FIG. 1A, the first thin film transistor 111 is at a side of the adjacent data lines close to the source driver 103, i.e. a proximal side. Further, in this case, the first thin film transistor may be located in an area between the fan-shaped wiring area and the source driver. The fan-shaped wiring area is known in the art, so it will not be elaborated herein. The area between the fan-shaped wiring area and the source driver has a small space, so it is suitable for a small thin film transistor so as to utilize the wiring space more reasonably, as shown in FIG. 3C. In certain exemplary embodiments, the first thin film transistor may also be located in an area between the display area and the fan-shaped wiring area. Since the area between the display area and the fan-shaped wiring area is large, a large thin film transistor can be used and passage of a large current is allowed, accordingly, a better effect of charge sharing can be achieved, as shown in FIG. 3B. Of course, said first thin film transistor 111 can also be at a side of said adjacent data lines far away from the source driver 103, i.e. a distal side.

Said source driver 103 can also be connected to the gate driver 104 so as to provide a turn-on signal for the gate driver thereto. It should be pointed out that the gate of the first thin film transistor 111 may alternatively be provided with the turn-on signal for the gate driver so as to turn on said first thin film transistor in the blank time period between adjacent data frames. In this case, said source driver 103 can provide the turn-on signal for the gate driver to the gate of the first thin film transistor 111 through the STV signal line 105 connected to the source driver 103, as will be described below with reference to FIG. 1B. In certain exemplary embodiments, one or more of said gate lines can be dummy gate lines, as will be described below.

It should be pointed out that the above embodiment of the array substrate is only described as an example. In other embodiments, the charge sharing device in said array substrate may comprise two or more first thin film transistors arranged in the way described above, and the larger the number of the first thin film transistors, the better the effect of charge sharing.

Figure 1B:
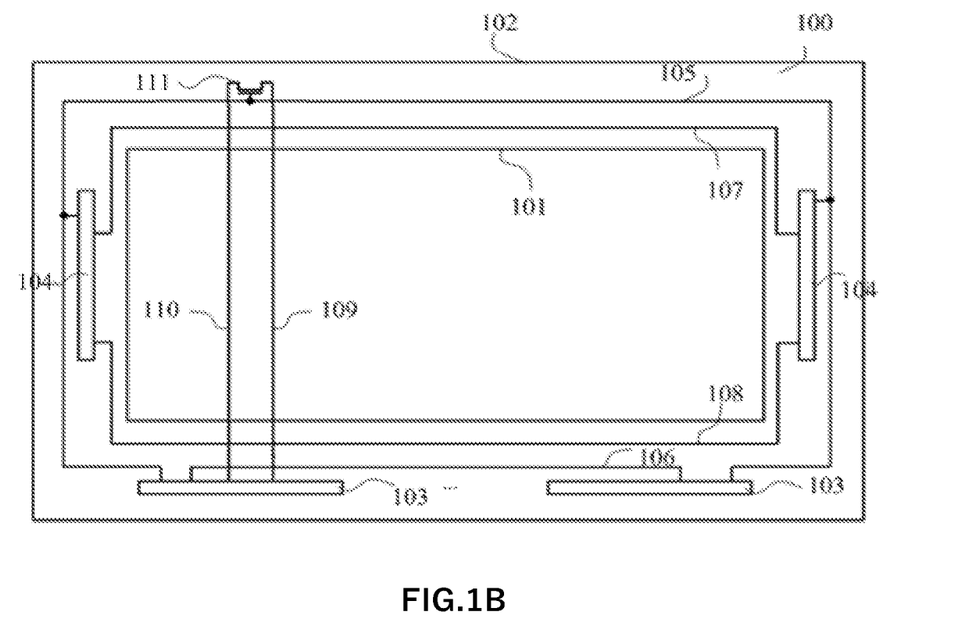
FIG. 1B shows an array substrate according to a second embodiment of the present disclosure.

FIG. 1B shows an array substrate 100 according to a second embodiment of the present disclosure. In FIG. 1B, the gate of the first thin film transistor 111 is connected to the STV signal line 105. As mentioned above, said STV signal line 105 is connected to the source driver 103. Said source driver 103 is outside of the display area and provides a turn-on signal for the gate driver 104 to the gate of the first thin film transistor 111 through the STV signal line 105. The turn-on signal for the gate driver 104 is in the blank time period between adjacent data frames. Thus, by providing the turn-on signal for the gate driver to the gate of the first thin film transistor 111, the first thin film transistor can be turned on in the blank time period between adjacent data frames.

In FIG. 1B, said first thin film transistor 111 is at a side of said adjacent data lines far away from the source driver 103, i.e. a distal side. Of course, said first thin film transistor 111 can also be at a side of said adjacent data lines close to the source driver 103, i.e. a proximal side, as described in the above with reference to FIG. 1A.

It should be noted that the above embodiment of the array substrate is only described as an example. In other embodiments, the charge sharing device in said array substrate may comprise two or more first thin film transistors arranged in the way described above, and the larger the number of the first thin film transistors, the better the effect of charge sharing.

Figure 1C:
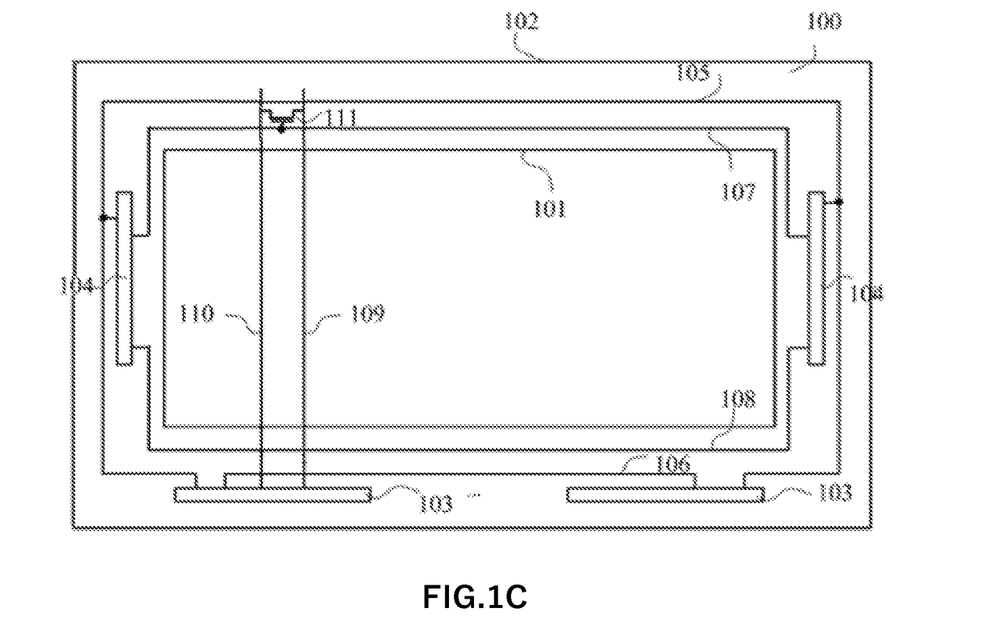
FIG. 1C shows an array substrate according to a third embodiment of the present disclosure.

FIG. 1C shows an array substrate 100 according to a third embodiment of the present disclosure. In FIG. 1C, the gate line 107 is a first dummy gate line. Gate pulse signals provided on the first dummy gate line are not used as scanning signals for igniting the liquid crystal cells, but they only function to stabilize the gate pulse signals. Before or after providing all conventionally set gate lines (e.g. within the display area) with gate pulse signals that are used as scanning signals for igniting the liquid crystal cells, said first dummy gate line is provided with gate pulse signals. The gate of the first thin film transistor 111 is connected to the first dummy gate line 107. In this case, the first control signal can be the gate pulse signal on the first dummy gate line 107. The gate pulse signal on the first dummy gate line 107 is in the blank time period between adjacent data frames. Thus, by providing the gate pulse signal on the first dummy gate line 107 to the gate of the first thin film transistor 111, the first thin film transistor can be turned on in the blank time period between adjacent data frames.

In FIG. 1C, the first thin film transistor 111 and the gate line 107 are both at the side of the adjacent data lines far away from the source driver 103, i.e. the distal side. Alternatively, in this case, when the scanning direction for the gate lines is from the distal side to the side close to the source driver 103 (i.e. the proximal side), said first dummy gate line 107 is provided with gate pulse signals prior to other gate lines. Of course, the first thin film transistor 111 and the gate line 107 can also be at the proximal side.

It should be noted that the above embodiment of the array substrate is only described as an example. In other embodiments, the charge sharing device in said array substrate may comprise two or more first thin film transistors arranged in the way described above, and the larger the number of the first thin film transistors, the better the effect of charge sharing.

Figure 1D:
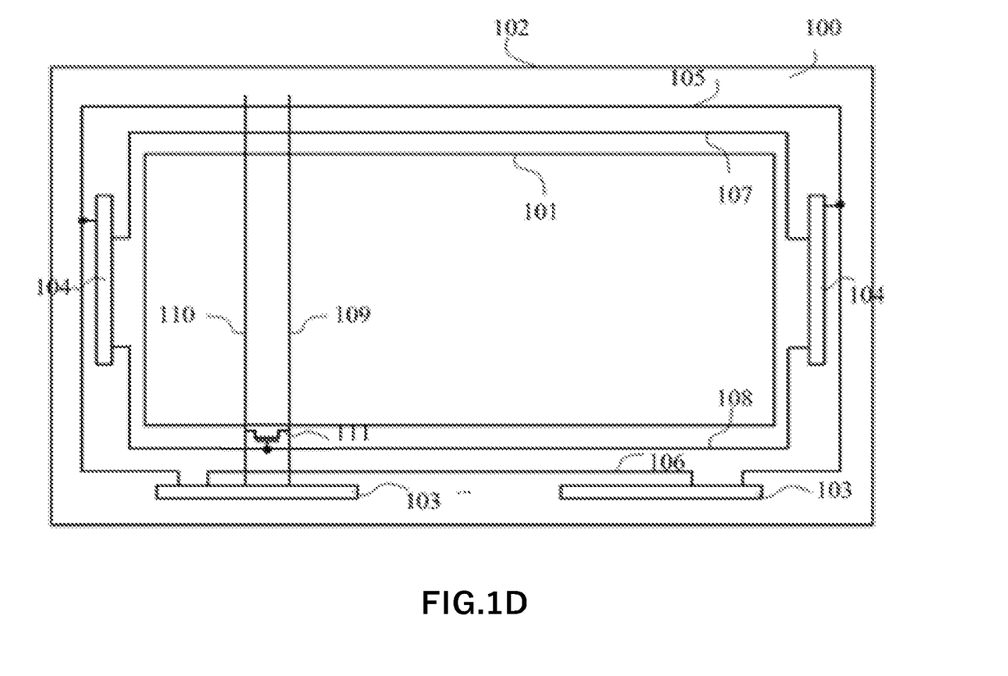
FIG. 1D shows an array substrate according to a fourth embodiment of the present disclosure.

FIG. 1D shows an array substrate 100 according to a fourth embodiment of the present disclosure. As shown in FIG. 1D, the gate line 108 is a first dummy gate line. The gate of the first thin film transistor 111 can be connected to said first dummy gate line 108. In this case, the first control signal can be the gate pulse signal on said first dummy gate line 108. The gate pulse signal on said first dummy gate line 108 is in the blank time period between adjacent data frames. Thus, by providing the gate pulse signal on said first dummy gate line to the gate of the first thin film transistor 111, the first thin film transistor can be turned on in the blank time period between adjacent data frames.

In FIG. 1D, the first thin film transistor 111 and the gate line 108 are both at the side of the adjacent data lines close to the source driver 103, i.e. the proximal side. Alternatively, in this case, when the scanning direction for the gate lines is from the proximal side to the side far away from the source driver 103 (i.e. the distal side), said first dummy gate line 108 is provided with gate pulse signals prior to other gate lines. Of course, the first thin film transistor 111 and the gate line 108 can also be at the distal side.

It should be pointed out that the above embodiment of the array substrate is only described as an example. In other embodiments, the charge sharing device in said array substrate may comprise two or more first thin film transistors arranged in the way described above, and the larger the number of the first thin film transistors, the better the effect of charge sharing.

It should be noted that the elements in FIGS. 1B, 1C and 1D which are not described have the same function and arrangement as the corresponding elements in FIG. 1A, so for the sake of simplicity, they will not be described herein.

It should also be noted that the thin film transistor mentioned above can be an N-type thin film transistor or a P-type thin film transistor, which is not limited herein. The first terminal of the thin film transistor as mentioned above can be a source or a drain, and correspondingly, the second terminal of the thin film transistor can be a drain or a source.

It should also be noted that although four types of charge sharing devices are described independently in embodiments of different array substrates in the above text, any two or more of said four array substrates can be combined in the embodiment of one array substrate. As an example, an exemplary array substrate is described below with reference to FIG. 2, in which a combination of all the above-mentioned four types of charge sharing devices is provided.

Figure 2:
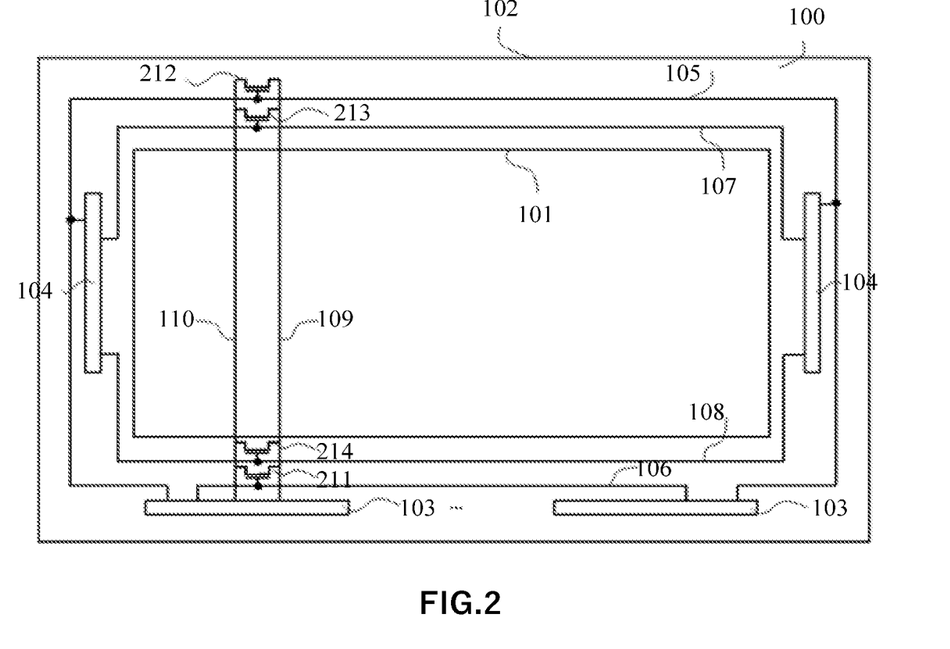
FIG. 2 shows an array substrate according to a fifth embodiment of the present disclosure.

FIG. 2 shows an array substrate 100 according to a fifth embodiment of the present disclosure. As shown in FIG. 2, the charge sharing device of said array substrate comprises four thin film transistors 211, 212, 213 and 214 that are out of the display area of the array substrate.

A first terminal of the thin film transistor 211 is connected to a data line 109, a second terminal thereof is connected to an adjacent data line 110 and a gate thereof is connected to the STV signal line 106. The thin film transistor 211 is at the side of the adjacent data lines close to the source driver 103. The STV signal line 106 can be connected to the source driver 103. The source driver 103 is outside of the display area of the array substrate and provides a frame turn-on signal to the gate of the first thin film transistor 211 through the STV signal line 106.

A first terminal of the thin film transistor 212 is connected to the data line 109, a second terminal thereof is connected to the data line 110 and a gate thereof is connected to the STV signal line 105. The thin film transistor 212 is at the side of the adjacent data lines far away from the source driver 103. The STV signal line 105 can be connected to the source driver 103. The source driver 103 provides a turn-on signal for the gate driver to the gate of the thin film transistor 212 through the STV signal line 105.

A first terminal of the thin film transistor 213 is connected to the data line 109, a second terminal thereof is connected to the data line 110 and a gate thereof is connected to the first dummy gate line 107. The thin film transistor 213 and the first dummy gate line 107 are both at the side of the adjacent data lines of the adjacent data lines far away from the source driver 103, i.e. the proximal side. The gate pulse signal on the first dummy gate line 107 is in the blank time period between adjacent data frames. Thus, by providing the gate pulse signal on the first dummy gate line 107 to the gate of the thin film transistor 213, the thin film transistor 213 can be turned on in the blank time period between adjacent data frames.

A first terminal of the thin film transistor 214 is connected to the data line 109, a second terminal thereof is connected to the data line 110 and a gate thereof is connected to the second dummy gate line 108. The thin film transistor 214 and the second dummy gate line 108 are both at the side of the adjacent data lines far away from the source driver 103, i.e. the distal side. The gate pulse signal on the second dummy gate line 108 is in the blank time period between adjacent data frames, so by providing the gate pulse signal on the second dummy gate line 108 to the gate of the thin film transistor 214, the thin film transistor 214 can be turned on in the blank time period between adjacent data frames.

In the above embodiments, when the scanning direction for the gate lines is from the distal side to the proximal side, said first dummy gate line 107 is provided with gate pulse signals prior to other gate lines. When the scanning direction for the gate lines is from the proximal side to the distal side, said second dummy gate line 108 is provided with gate pulse signals prior to other gate lines.

It should be pointed out that the "first" in the first dummy gate line and the "second" in the second dummy gate line are not specific or restrictive, but they are only used for facilitating description. For example, the first dummy gate line and the second dummy gate line can be used interchangeably.

Figure 3A:
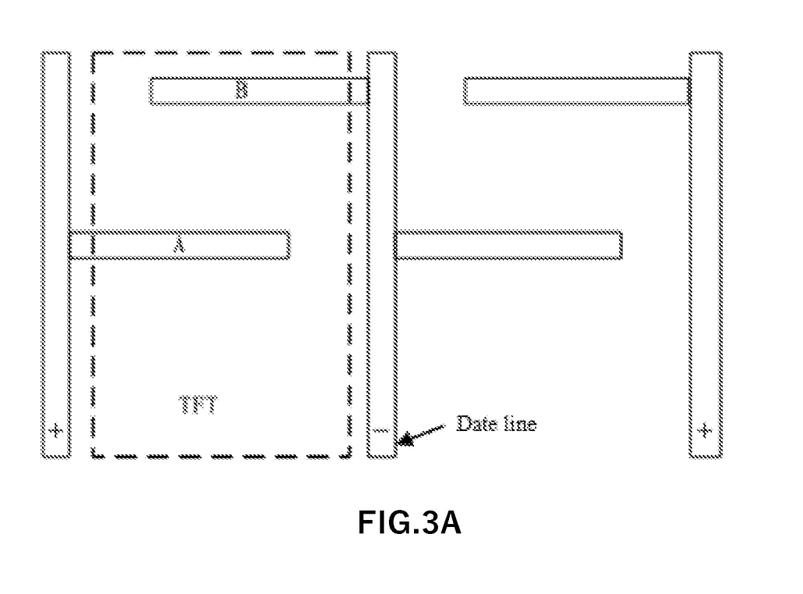
FIGS. 3A-3C are structural diagrams of a first thin film transistor in a shared switch of the array substrate according to the present disclosure.
Figure 3B:
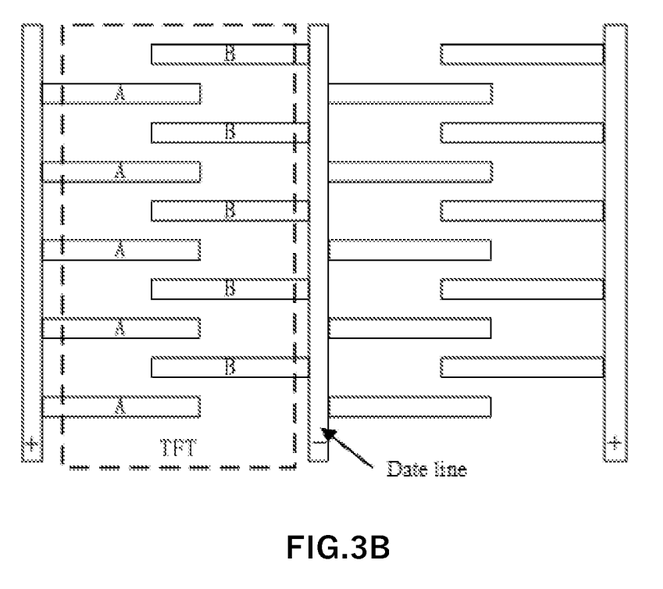
Figure 3C:
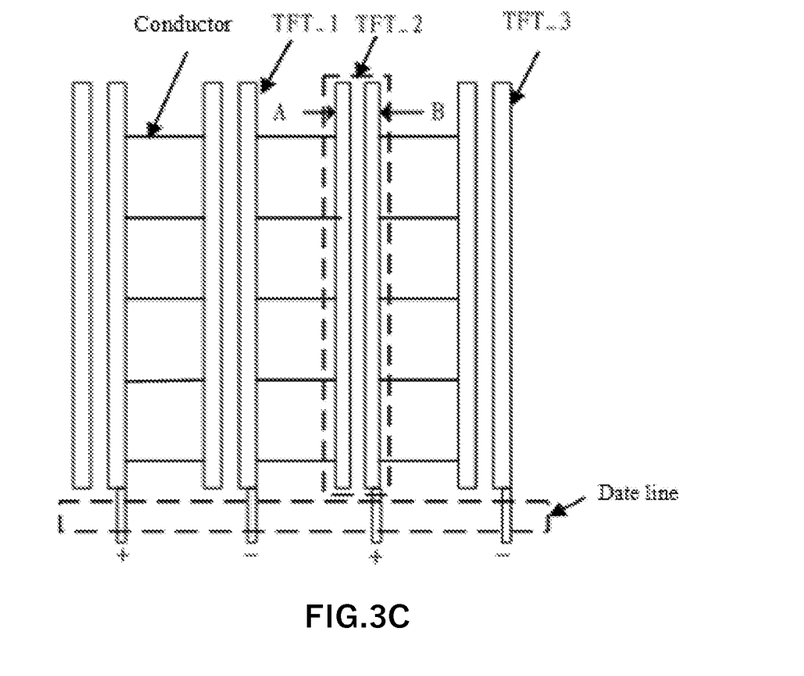

FIG. 3A is a structural diagram of a first thin film transistor (TFT) in a shared switch of the array substrate according to the present disclosure. As shown in FIG. 3A, a first terminal A of said TFT is connected to a data line with a positive polarity, and a second terminal B thereof is connected to an adjacent data line with a negative polarity.

FIG. 3B is a structural diagram of a first thin film transistor (TFT) in a shared switch of the array substrate according to the present disclosure. As shown in FIG. 3B, the first terminal and second terminal of the TFT may have a U-shape structure and may be intersected with each other. As shown in FIG. 3B, a terminal indicated by A represents the first terminal of the TFT, and a terminal indicated by B represents the second terminal of the TFT, wherein both the first terminal and the second terminal have a U-shape structure and are intersected with each other. By means of such a structure, the size of the thin film transistor can be increased so as to allow passage of a large current. As a result, a better charge sharing effect can be achieved.

FIG. 3C is a structural diagram of a first thin film transistor (TFT) in a shared switch of the array substrate according to the present disclosure. When there is a stage formed by the thin film transistor between any two adjacent data lines among a plurality of data lines, as shown in FIG. 3C and as an example, a second terminal B of the thin film transistor TFT_2 is connected to a data line with a positive polarity, and a first terminal A of said TFT_2 is connected to a second terminal of an adjacent TFT_1 or to an adjacent data line with a negative polarity through a conductor. As shown in FIG. 3C, the first terminal of TFT_2 can be connected to a second terminal of an adjacent previous stage (left) TFT_1 through the conductor, and the second terminal of TFT_2 can be connected to a first terminal of an adjacent next stage (right) TFT_3 through the conductor. Of course, connecting through the conductor is merely an example, for instance, when two TFTs are close to each other, said connection can be a direction connection without using any conductor. By means of such a structure, a small thin film transistor can be used as the charge sharing device of the present disclosure.

It should be noted that the "connection" in this text usually refers to "electrical connection" unless otherwise specified.

Figure 4:
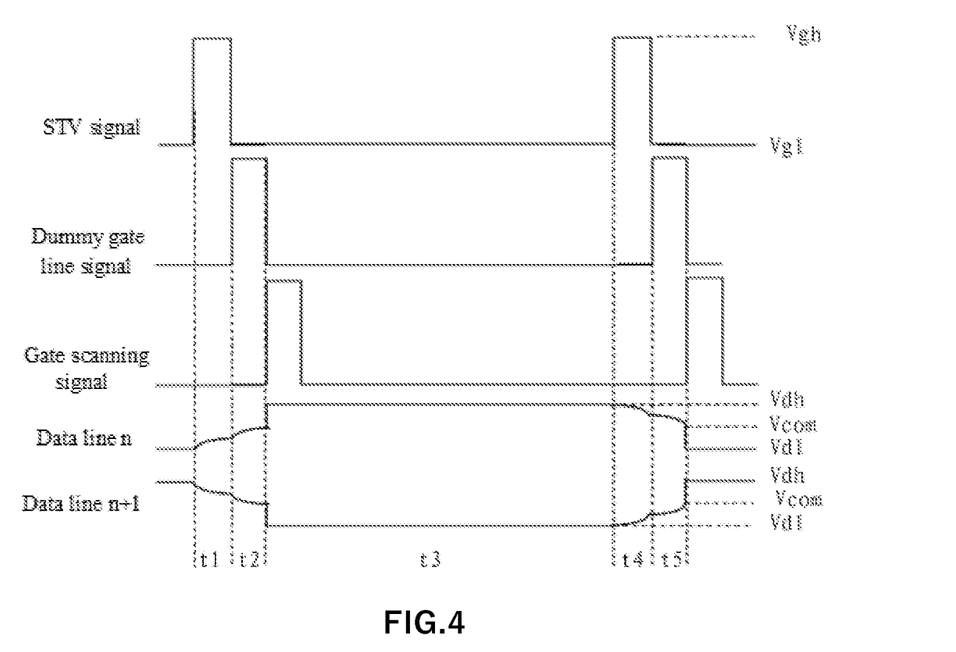
FIG. 4 generally shows a sequence diagram of signals on respective signal lines on the array substrate according to the present disclosure.

FIG. 4 generally shows a sequence diagram of signals on respective signal lines on the array substrate according to the present disclosure. As shown in FIG. 4, the signal (STV signal) on the STV signal line is provided in time period t1. As mentioned above, said STV signal can be the frame turn-on signal or the turn-on signal for the gate driver. The gate pulse signal (dummy gate line signal) on the dummy gate line is provided in time period t2. In a following time period t3, conventional gate lines are provided with gate pulse signals (gate scanning signals). The time period t3 is a time of charging for all pixels within one frame. In FIG. 4, said signals are all shown as high level signals Vgh when being provided, but this is only exemplary instead of being restrictive. In the figure, Vgl represents a low level.

It can be seen from FIG. 4 that when signals on any adjacent data lines n and n+1 undergo a polarity reversal, after the charging sharing in time periods t1 and t2, the potential of the signal on data line n is pulled from a low level Vdl to a charge sharing potential Vcom, for example, and a target potential of the signal on said data line n is a high level Vdh; while the potential of the signal on data line n+1 is pulled from the high level Vdh to the charge sharing potential Vcom, for example, and a target potential of the signals on said data line n+1 is the low level Vdl. Generally, the charge sharing potential Vcom is an intermediate value between the high level Vdh and the low level Vdl, i.e. a half of the sum of Vdh and Vdl. In this way, the time needed for reversing the potential of the signal on data line n to the target potential and reversing the potential of the signal on data line n+1 to the target potential can be reduced, thereby saving electrical power consumption. When inputting the next frame, signals on adjacent data lines n and n+1 can undergo a next polarity reversal in time periods t4 and t5.

It should be noted that t1, t2, t4 and t5 in FIG. 4 are all set in the frame blank time periods of the image display, in which time periods potential changes on the data lines will not influence gray scale signal writing for the display area pixels.

It should be understood that for the sake of clarity, embodiments of the present disclosure are described with reference to different units or components. However, it is apparent that the functionality of each functional unit can be implemented in a single unit, in multiple units or be implemented as a part of some other functional unit without departing from the content of the present disclosure. For example, a functionality described as being implemented by a single unit may be implemented by several different units. Thus, reference to a specific functional unit shall only be considered as reference to an appropriate unit for providing the described functionality, but it does not indicate any strict logical or physical structure or organization.

Although the present disclosure has been described in conjunction with some embodiments, the present disclosure is not limited to the specific ways described herein. The scope of the present disclosure shall only be defined by the appended claims. Additionally, individual features can be included in different claims, but said features can be combined to advantage, and the fact that said features are included in different claims does not mean that combination of them are infeasible and/or disadvantageous. The sequence of the features in the claims does not suggest any specific sequence that must be followed by the features. In addition, in the claims, the word "comprise" does not mean to exclude other elements, and the indefinite article "a" or "an" does not mean to exclude multiple. Reference signs used in the claims are only provided as explicit examples, but they should not be construed as limiting the claims in any way.

The invention claimed is:

1. An array substrate having a display area and a non-display area in the periphery of the display area, and comprising:
   a plurality of gate lines to which gate pulse signals are provided;
   a plurality of data lines to which data signals are provided, wherein signals on adjacent ones of said plurality of data lines have opposite polarities and are provided by a source driver;
   a charge sharing device comprising a first thin film transistor in the non-display area, a first terminal of said first thin film transistor being connected to one of two adjacent data lines among said plurality of data lines, a second terminal thereof being connected the other of the two adjacent data lines, and a gate thereof being configured to receive a frame turn-on signal provided by the source driver through a STV signal line as a first control signal in a blank time period between adjacent data frames so as to turn on said first thin film transistor.

2. The array substrate according to claim 1, wherein said plurality of gate lines further includes a first dummy gate line in the non-display area, and said charge sharing circuit further includes a second thin film transistor in the non-display area, a first terminal of said second thin film transistor being connected to one of the two adjacent data lines, a second terminal thereof being connected the other of the two adjacent data lines, and a gate thereof being connected to said first dummy gate line and configured to receive a second control signal on said first dummy gate line in a blank time period between adjacent data frames so as to turn on said second thin film transistor.

3. The array substrate according to claim 2, wherein said second control signal comprises a frame turn-on signal or a turn-on signal for the gate driver.

4. The array substrate according to claim 2, wherein the second control signal is a gate pulse signal on said first dummy gate line and is provided in a different time period from that of the first control signal.

5. The array substrate according to claim 4, wherein said first dummy gate line is at a side of said plurality of data lines far away from the source driver configured to provide data signals to said plurality of data lines.

6. The array substrate according to claim 5, wherein under the condition that the scanning direction for the gate lines is from the side of said plurality of data lines far away from the source driver to the side close to the source driver, said first dummy gate line is provided with a gate pulse signal prior to other gate lines.

7. The array substrate according to claim 2, wherein said first dummy gate line is at a side of said plurality of data lines close to a source driver configured to provide data signals to said plurality of data lines, and under the condition that the scanning direction for the gate lines is from the side of said plurality of data lines close to the source driver to the side far away from the source driver, said first dummy gate line is provided with a gate pulse signal prior to other gate lines.

8. The array substrate according to claim 1, wherein each of the first terminal and the second terminal of the first thin film transistor adopts a U-shape structure and they are intersected with each other.

9. The array substrate according to claim 1, wherein under the condition that there is a stage formed by the thin film transistor between any two adjacent data lines among said plurality of data lines, the first terminal of the first thin film transistor is connected to a second terminal of an adjacent previous stage thin film transistor, and the second terminal of the first thin film transistor is connected to a first terminal of an adjacent next stage thin film transistor.

10. The array substrate according to claim 1, wherein the first thin film transistor is located between a fan-shaped wiring area and the source driver.

11. The array substrate according to claim 1, wherein the first thin film transistor is located between the fan-shaped wiring area and the display area.

12. A liquid crystal display panel comprising the array substrate according to claim 1.

13. A display device comprising the liquid crystal display panel according to claim 12.

14. The liquid crystal display panel according to claim 12, wherein said plurality of gate lines further includes a first dummy gate line in the non-display area, and said charge sharing circuit further includes a second thin film transistor in the non-display area, a first terminal of said second thin film transistor being connected to one of the two adjacent data lines, a second terminal thereof being connected the other of the two adjacent data lines, and a gate thereof being connected to said first dummy gate line and configured to receive a second control signal on said first dummy gate line in a blank time period between adjacent data frames so as to turn on said second thin film transistor.

15. The liquid crystal display panel according to claim 14, wherein said second control signal comprises a frame turn-on signal or a turn-on signal for the gate driver.

16. The liquid crystal display panel according to claim 14, wherein the second control signal is a gate pulse signal on said first dummy gate line and is provided in a different time period from that of the first control signal.

17. The liquid crystal display panel according to claim 16, wherein said first dummy gate line is at a side of said plurality of data lines far away from the source driver configured to provide data signals to said plurality of data lines.

18. The liquid crystal display panel according to claim 17, wherein under the condition that the scanning direction for the gate lines is from the side of said plurality of data lines far away from the source driver to the side close to the source driver, said first dummy gate line is provided with a gate pulse signal prior to other gate lines.

19. The liquid crystal display panel according to claim 14, wherein said first dummy gate line is at a side of said plurality of data lines close to a source driver configured to provide data signals to said plurality of data lines, and under the condition that the scanning direction for the gate lines is from the side of said plurality of data lines close to the source driver to the side far away from the source driver, said first dummy gate line is provided with a gate pulse signal prior to other gate lines.

20. The liquid crystal display panel according to claim 12, wherein each of the first terminal and the second terminal of the first thin film transistor adopts a U-shape structure and they are intersected with each other.

* * * * *